G. H. GIBSON.
HEATING AND PURIFYING WATER.
APPLICATION FILED MAY 27, 1911.
1,080,826.
Patented Dec. 9, 1913.
2 SHEETS—SHEET 1.
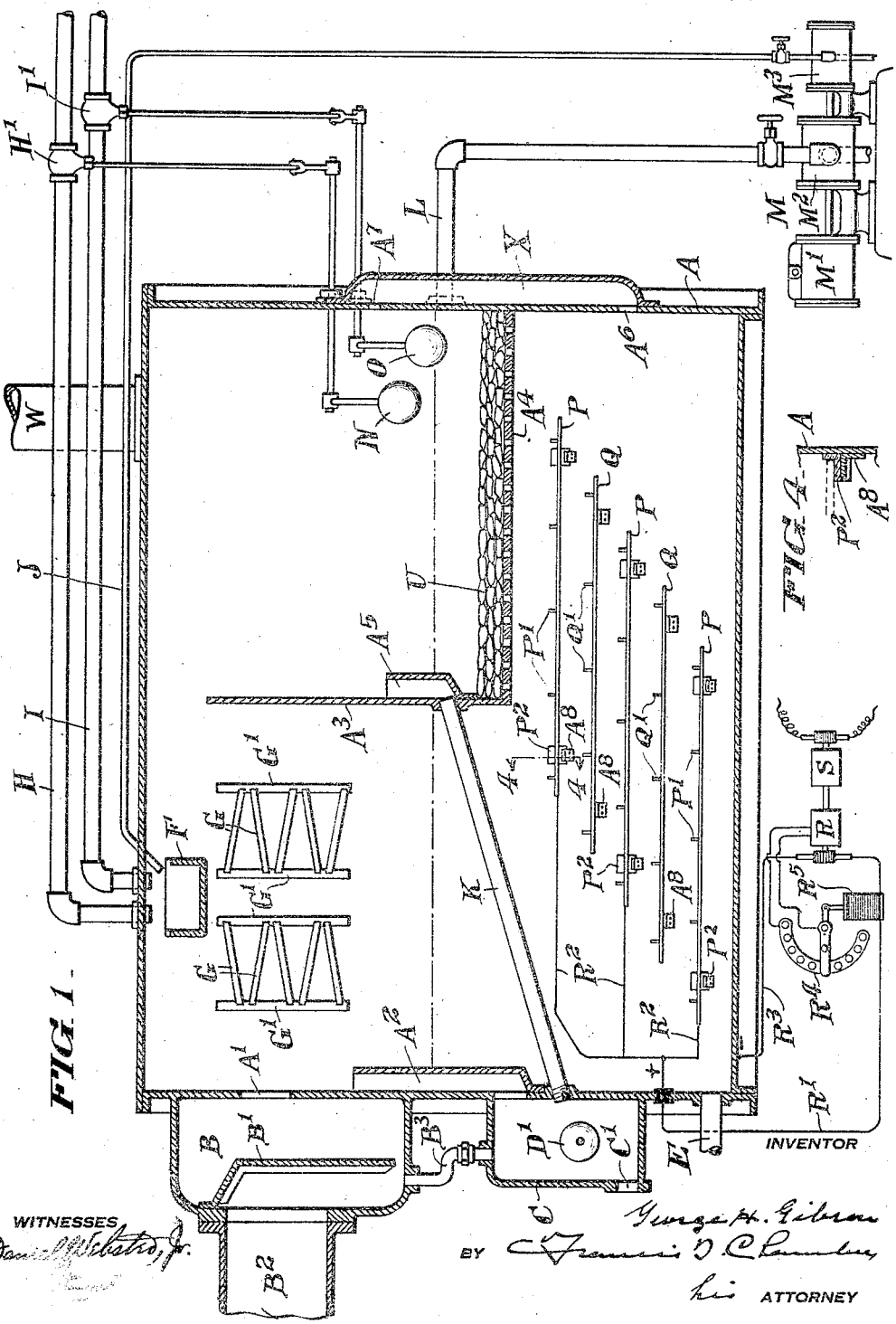

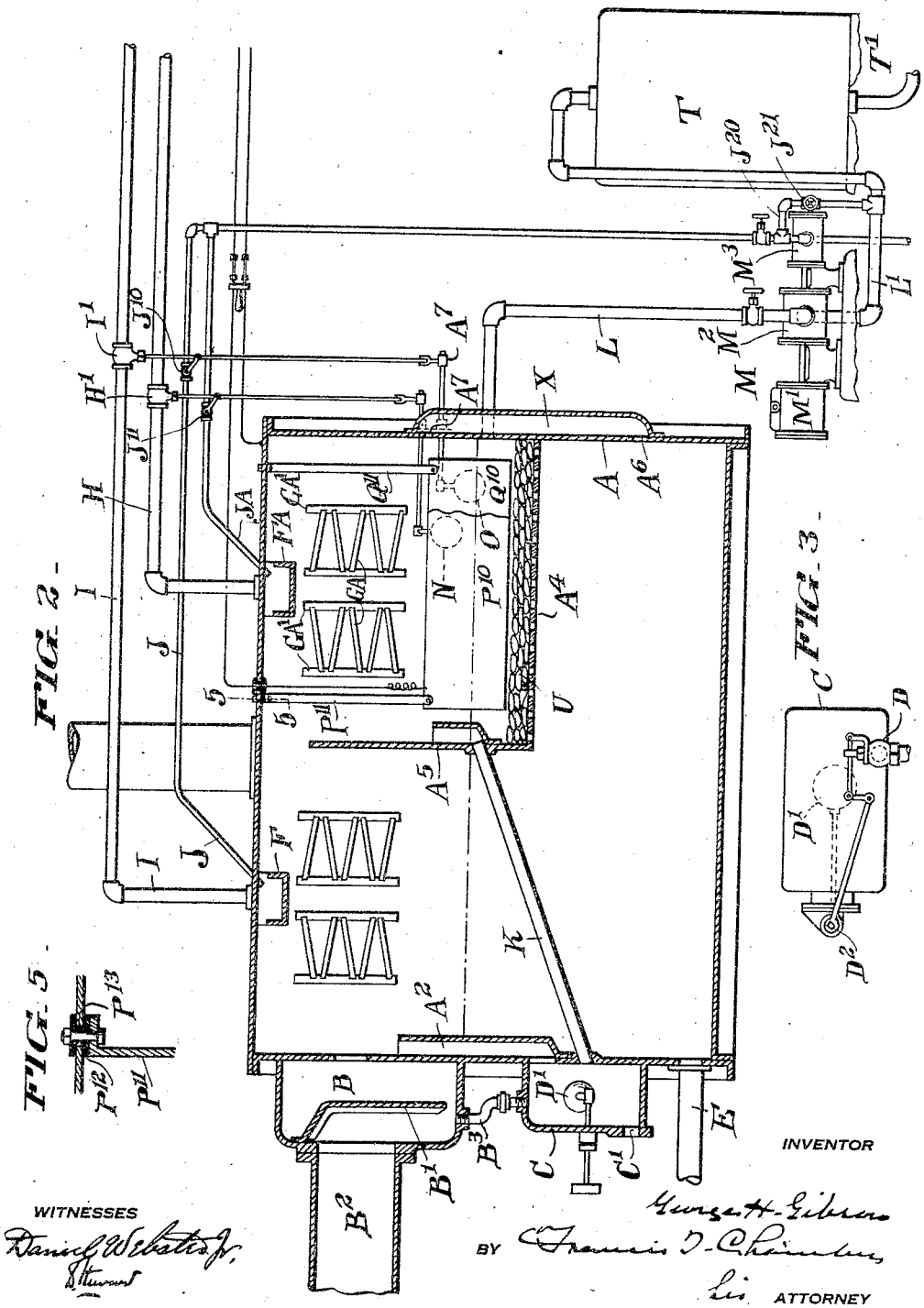

UNITED STATES PATENT OFFICE.

GEORGE H. GIBSON, OF MONTCLAIR, NEW JERSEY, ASSIGNOR TO JOSEPH S. LOVERING WHARTON, WILLIAM S. HALLOWELL, AND JOHN C. JONES, ALL OF PHILADELPHIA, PENNSYLVANIA, DOING BUSINESS AS THE FIRM OF HARRISON SAFETY BOILER WORKS, OF PHILADELPHIA, PENNSYLVANIA.

HEATING AND PURIFYING WATER.

1,080,826.  Specification of Letters Patent.  Patented Dec. 9, 1913.

Application filed May 27, 1911. Serial No. 629,876.

*To all whom it may concern:*

Be it known that I, GEORGE H. GIBSON, a citizen of the United States of America, residing in Montclair, in the county of Essex and State of New Jersey, have invented a certain new and useful Improvement in Heating and Purifying Water, of which the following is a true and exact description, reference being had to the accompanying drawings, which form a part thereof.

My present invention relates to the purification of water, and particularly to the preparation of purified water for boiler feed purposes out of the water of condensation formed from steam supplied to steam engines and such additional raw water as may be required.

The water of condensation formed from the steam exhausted from steam engines is practically free from the hardening or other impurities ordinarily found in natural water but does contain oil in amount sufficient to make it desirable to separate the oil out of the water. The oil contained by the condensate from the steam supplied to steam engines is largely in a very finely divided state or condition, being virtually in the form of an emulsion and cannot be satisfactorily removed by ordinary filtering processes. The raw makeup water ordinarily contains impurities which it is desirable to eliminate or modify before the water is passed to steam generating boilers in order to prevent objectionable scale formation therein.

I have found that water suitable for feed water purposes, *i. e.* sufficiently hot, soft, and free from oil and other objectionable impurities may be prepared out of the oil containing condensate from steam exhausted from steam engines and raw makeup water by a comparatively simple operation and by the aid of simple and effective apparatus, and my invention consists in part, in the method and in part in the apparatus employed for this purpose.

In carrying out my invention I mix the water from the two sources in a chamber into which steam is passed to heat the water practically to the boiling temperature and add to the water a chemical agent which serves the double function of raising the electrical conductivity of the water and of effecting a separation or a partial separation and partial conversion of the impurities contained in the makeup water. I then subject the chemically treated and heated mixture of water from the two sources to the action of an electric current passing between suitable electrodes and finally subject the electrolyzed and chemically treated water to a filtering process. I employ as anodes, electrodes of iron or aluminum on account of the flocculation effect of the ions entering the water from the anodes of these materials, and in practice I prefer that both the anodes and cathodes be formed of iron.

Practically any chemical reagent which is suitable for use in softening and purifying water for boiler feed purposes may be used in carrying out the present invention. In practice, I prefer to use for this purpose a reagent composed wholly or largely of soda ash (sodium carbonate) or of tri-sodium phosphate. The softening action of such reagents, particularly in converting and precipitating the calcium and magnesium compounds ordinarily found in natural waters and giving the latter its hardness, both temporary and permanent, is well known and does not require explanation.

An electric current passing through water between suitable electrodes is highly effective in flocculating the emulsified particles of oil contained therein which are agglomerated to an extent which permits of their ready removal by ordinary filtering processes, and is effective also in flocculating or coagulating, and thereby making possible the removal of particles precipitated from the added raw water which would otherwise, on account of their fineness, pass through the filter in part, and in part pass into, and objectionably clog the filter. The electric current also coagulates and makes possible the removal of albuminoid and other organic impurities contained in the raw water. The coagulating or flocculating effect of the electric current on each of the different finely divided material referred to, is, I believe enhanced by the presence of the others.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred forms of apparatus and preferred modes of carrying out my invention.

Of the drawings, Figure 1 is a somewhat diagrammatic representation of one form of apparatus with a portion of the apparatus in sectional elevation. Fig. 2 is a view similar to Fig. 1 of a slightly modified form of apparatus. Fig. 3 is an elevation of a portion of the apparatus employed in Fig. 1, taken at right angles to that figure. Fig. 4 is a partial section on the line 4—4, of Fig. 1 and Fig. 5 is a partial section on the line 5—5 of Fig. 2.

In the drawings, A, represents the heater tank provided with the usual steam inlet port A' leading from the steam chamber B which contains the usual oil separator and is supplied with steam for heating the water in the tank through the pipe $B^2$.

$A^2$, represents an overflow channel which opens into the waste box C.

The oil and other impurities collected in the lower end of the chamber B passes through the pipe $B^2$ to the waste box C, and with the overflow entering the waste box are intermittently discharged through the port C' and valve D controlling the latter (see Fig. 3). The valve D is controlled in turn by a float D' connected to the valve through the rockshaft $D^2$ and the usual connecting arms and links. The impurities collecting in the bottom of the tank A may be removed from time to time through the valve controlled sludge take off pipe E.

The raw water to be heated and treated is passed into the upper end of the heater through the raw water makeup pipe I, and the water of condensation enters the heater through the pipe H. These pipes discharge into a trough-like member F from which the water overflows onto banks of oppositely inclined trays or baffles G, mounted in tray guides G'. By introducing the water in this manner the water is divided into film-like and broken streams, thus facilitating the purification of the water and its heating by the steam admitted through the pipe $B^2$, chamber B and passage A'. The chemical purifying and softening agent is also discharged into the box F as through the pipe J. As shown in Fig. 1, the supply of this chemical agent is directly proportional to the amount of water withdrawn from the heater through the service discharge pipe L, since the latter leads from the heater to the inlet of the water pumping cylinder $M^2$ of a pump mechanism M which includes also a steam driving cylinder M', and a chemical pumping cylinder $M^3$ from the outlet port of which the pipe J leads. The flow of water through the pipes H and I is controlled by valves H' and I' operated by floats N and O located within the heater and moved by variations of the water level within the heater to open the valve H' in the water of condensation supply pipe H when the water level in the heater falls below one predetermined level, and to open the valve I' in the make up water supply pipe I when the water level falls to a second and lower predetermined level, and to close these valves in the reverse order as the water level rises first to one and then to the other predetermined level.

In the form of apparatus shown in Fig. 1, a transverse partition wall $A^3$ and perforated bottom wall $A^4$ provide a filter chamber in one portion of the tank which is freely open above the water level to the heating chamber proper, and into which water may flow through the perforated wall $A^4$ and filter bed U mounted thereon. The pipe L leads from this filter chamber above the filter bed and an overflow channel $A^5$ is provided which is connected by a pipe K to the waste box C. A bypass X, opening to the tank below the perforated wall $A^4$, at $A^6$ and above the wall $A^4$ at $A^7$, is provided for insuring a supply of water to the service discharge pipe L when the filter is so clogged that water will not flow through it rapidly enough to supply the demand. For practical reasons I consider it desirable that the level of the upper end of the overflow passage $A^2$ should be higher than the level of the upper end of the passage $A^5$, and that the bypass opening $A^7$ should be between the two overflow levels.

In the arrangement shown in Fig. 1, horizontal plate-like electrodes P and Q are arranged in the tank below the water level and partly below the bottom wall $A^4$ of the filter chamber and partly below the trays G. For reasons not necessarily dependent upon the electrolytic function of these plates, I prefer that they be arranged to transversely overlap, as shown, since this arrangement tends to increase the amount of precipitates separated out of the water before the filter bed is reached. In the case of precipitates generally, the separation out of the precipitates depends largely upon the distance the precipitated particles must fall before reaching a surface or surfaces upon which they can collect, and the time available for the fall, and in the case of fine precipitates, currents, such as eddy and convection currents, materially decrease the settling out of the precipitates. By arranging the electrodes, as shown, so that the water is compelled to flow through a number of comparatively shallow channels, the distance through which the precipitate particles must fall before finding surfaces upon which they can lodge is decreased and disturbing current effects are minimized. The equality of flow through the various horizontal channels between the electrodes contribute also to the effectiveness of the electrolytic action. The electrodes P and Q are supported in any suitable manner, as by means of brackets A⁸ secured to the opposite sides of the heater tank. The negative electrodes Q rest directly upon the brackets A⁸ and are thus electrically connected to the metallic shell of the tank body. The positive electrodes P should be insulated, however, from the tank shell to avoid electrolytic action on the heater proper. As shown, this insulation is effected by blocks or pads P² formed of insulating material interposed between the electrodes P and the tank shell and brackets A⁸. Transverse ribs P′ and Q′ may be formed on the upper sides of the electrodes as shown, to increase the amount of precipitates collected on the electrodes. The positive electrodes P are connected through branch conductors R² and a main conductor R′ to one pole of a suitable source of current, as the generator R, and the other pole of the generator is connected directly to the tank body and hence to the electrodes Q. As shown in Fig. 1, the generator R is driven by a suitable motor S and a rheostat R⁴ automatically actuated, as by the electromagnet R⁵, in response to the current flow through the circuit including the electrodes P and Q, is employed to adjust the field excitation of the generator R to maintain a constant electrical current flow of the proper strength between the electrodes P and Q regardless of the variations in the resistance to this flow.

The general mode of use of the apparatus will be apparent from the foregoing explanation. A considerable proportion of the solid impurities found in the water after it has been heated and acted upon by the added reagent or reagents is in the form of precipitates so finely divided as to constitute a more or less permanent suspension. But for the electrolytic action of the current passing between the electrodes P and Q, the suspended matter and the oil in emulsion in large part at least would neither be directly precipitated in the heater tank nor entirely strained out of the water by the filter. The addition of the raw water with its impurities and the addition of the soda ash or other chemical reagent serves to give the entire body of water treated a substantially higher conductivity than is possessed by the water of condensation entering the heater through the supply pipe H. The passage of electric current between the electrodes P and Q so affects the solid matter held in suspension in the water, and so destroys the emulsified condition of the oil that the solid matter and oil coagulate and may be readily removed by filtration or subsidence. Impurities collecting and floating as a scum at the top of the water may be floated off from time to time through the overflow connections A² and A⁵ by temporarily raising the water level in the heater when it is desired to do this. The vapors and excess steam may escape from the heater through the outlet pipe W.

I believe that the beneficial effects obtained by treating water in accordance with the present invention may be correctly explained as follows: The emulsified particles of oil bear negative charges of electricity and hence are mutually repellent. The fine precipitate particles in more or less permanent suspension in the water also bear charges of electricity. These charges may be positive or negative, but in general I believe that the solid particles in suspension in the water treated in accordance with the present invention, bear negative charges. The action of the current flowing through the water between the electrodes is to neutralize the electrical charges borne by the oil and other suspended particles. This is brought about by the charged ions set free in the water at the electrodes by the action of the electric current which contact with the charged particles in suspension in the water and neutralize the charges borne by the latter and thus exert a flocculating effect. In particular, I believe that in carrying out the invention as described above, wherein both oil and solid particles in suspension are negatively charged these charges are neutralized by means of positive charges of electricity borne by the colloidal hydrate of iron or aluminum ions set free at the positive electrodes, the nature of the hydrate of course depending on whether or not these electrodes are of iron or aluminum. I believe that the joint presence of the oil emulsion particles and the finely divided impurity particles in the water through which the electric current passes increases the flocculating or coagulating effect of the current on each kind of particles, perhaps in part at least, by increasing the number of coagulating centers, so to speak, which exist when the charges of electricity on the emulsified particles of oil and suspended solid impurities are neutralized. The more numerous the precipitates the larger are the resultant particles or agglomerations and the more rapidly they fall through the water. The large falling particles have the beneficial effect of screening the water; i. e. of carrying down the finer precipitates in suspension which might otherwise be very slow in falling. The heating of the water characteristic of my invention, is in itself beneficial in furthering the precipitation of the suspended or colloidal matter contained by the water.

Whether or not the explanation of the theory of operation given in the foregoing paragraph is correct, the mode of treatment described is highly successful in the production of heated and purified water suitable for boiler feed purposes out of the oil containing condensate and impure raw water.

The apparatus shown in Fig. 2 differs from that shown in Fig. 1 in that the water of condensation supply pipe H discharges into a box FA located above the filter bed and from which the water passes down in the filter chamber over a corresponding set of trays GA mounted in tray guides GA'. In this form there is also a branch chemical supply pipe JA which discharges into the box FA. The chemical supply pipe J running to the box F is controlled by a valve $J^{10}$ and the branch chemical supply pipe JA is controlled by a valve $J^{11}$. The valve $J^{10}$ is controlled by the float O which controls the valve I' and similarly the valve $J^{11}$ is controlled by the float N which also controls the valve H'. To permit the chemical supply pump to operate without damaging the apparatus when the valves $J^{10}$ and $J^{11}$ are both closed, I provide a bypass $J^{20}$ about the pump cylinder $M^2$; this bypass containing a loaded valve $J^{21}$. In the form of apparatus shown in Fig. 2, the electrodes $P^{10}$ and $Q^{10}$ are in the form of vertical plates suspended in the filter chamber as by means of the suspension arms $P^{11}$ and $Q^{11}$ secured to the top wall of the tank. The suspension arms $P^{11}$ for the positive electrodes are insulated from the tank wall, as by means of the insulating pads $P^{12}$ and bushing $P^{13}$ (see Fig. 5). The purified and heated water is withdrawn from the heater through the pipe L and is forced from the pump through the pipe L' to the filter tank T from which a discharge pipe T' may lead to the boiler or other water using apparatus. In this form of the apparatus the filter bed U on the perforated plate $A^4$ serves as a preliminary filter for screening out of the water a portion of the impurities contained in the water. The emulsified oil particles and solid impurities fine enough to pass through the filter bed supported by the plate $A^4$ are removed either by subsidence in the filter chamber of the heater or by the action of the filter T after the water is electrolyzed. The apparatus of Fig. 2 is particularly intended for use where the water of condensation forms a relatively large portion of the total amount of water treated.

Having now described my invention, what I claim as new and desire to secure by Letters Patent, is:

1. The method of preparing heated and purified water suitable for boiler feed purposes out of the oil containing condensate from steam engines and raw makeup water, which consists in mixing with the oil containing condensate, raw makeup water in amount sufficient to supply the demand for heated and purified water, and heating the water from the two sources and adding a chemical reagent for increasing the electrical conductivity of the water and for precipitating or converting the boiler incrusting impurities in the raw water component of the heated water and subjecting the heated and chemically treated water to electrolytic action and thereafter filtering the water.

2. The method of preparing heated and purified water suitable for boiler feed purposes out of the oil containing condensate of steam engines and raw makeup water which consists in mixing with the oil containing condensate, raw makeup water in amount sufficient to supply the demand for heated and purified water, and heating the water from the two sources and adding a chemical reagent adapted for increasing the electrical conductivity of the water and for precipitating or converting the boiler incrusting impurities in the raw water component of the heated water and electrolyzing the mixture in such manner as to generate therein positively charged colloidal hydrate ions and thereafter filtering the water.

3. The method of preparing heated and purified water suitable for boiler feed purposes out of the oil containing condensate of steam engines and raw makeup water which consists in mixing with the oil containing condensate, raw makeup water in amount sufficient to supply the demand for heated and purified water and heating the water from two sources and adding a chemical reagent for increasing the electrical conductivity of the water and for precipitating or converting the boiler incrusting impurities in the raw water component of the heated water and electrolyzing the mixture in such manner as to generate therein positively charged iron hydrate ions.

4. Apparatus for heating and purifying water having in combination a water heater comprising a heating chamber and means for supplying water to be treated, steam for heating the water, and a chemical purifying agent to said chamber, and for discharging hot water therefrom, said means including provisions for limiting the height of the water level in the heater, electrode surfaces located in said heating chamber below the water level therein and means for causing an electric current to flow between said surfaces through the water contacting them.

5. Apparatus for heating and purifying water having in combination a water heater formed with a main heating chamber and a filter chamber and provided with a filter bed through which water may flow from said main chamber into said filter chamber, means for supplying water to be treated, steam for heating the water and a chemical purifying agent to said heater and for discharging hot water therefrom, said means including a hot water service discharge outlet from the filter chamber, separate overflow provisions for the two chambers and provisions for discharging water to be treated into the upper end of said main chamber, electrode surfaces located in said heater below the normal water level and means for causing an electric current to flow between said surfaces through the water between them.

6. Apparatus for heating and purifying water having in combination a water heater formed with a main heating chamber and a filter chamber and provided with a filter bed through which water may flow from said main chamber into said filter chamber, means for supplying water to be treated, steam for heating the water and a chemical purifying agent to said chamber and for discharging hot water therefrom, said means including a hot water service discharge outlet from the filter chamber, overflow provisions, and provisions for discharging water to be treated into the upper end of said main chamber, electrodes located in said main chamber and arranged to provide a plurality of separate channels through which water passes from the main chamber to said filter bed, and means for causing an electric current to flow between said electrodes through the water between them.

7. Apparatus for heating and purifying water having in combination a water heater formed with a main heating chamber and a filter chamber and provided with a filter bed through which water may flow from said main chamber into said filter chamber, means for supplying water to be treated, steam for heating the water and a chemical purifying agent to said chamber and for discharging hot water therefrom, said means including a hot water service discharge outlet from the filter chamber, overflow provisions, and provisions for discharging water to be treated into the upper end of said main chamber, and plates located in said main chamber providing superimposed channels through which the water flows from said main chamber to said filter bed.

8. Apparatus for heating and purifying water having in combination a water heater comprising a heating chamber and means for supplying to said chamber water of condensation and makeup water, steam for heating the water and a chemical purifying agent, a hot water service discharge connection leading from said chamber, means for limiting the maximum height of water level in the heater including means responsive to the accumulation of water in the heater for cutting off the supply of the makeup water to the heater, electrode surfaces located in said heating chamber below the water level therein and means for causing an electric current to flow between said surfaces through the water contacting them.

GEO. H. GIBSON.

Witnesses:
R. D. B. WRIGHT,
ROBERT G. CLIFTON.